(12) United States Patent
Cameron et al.

(10) Patent No.: US 8,562,046 B2
(45) Date of Patent: Oct. 22, 2013

(54) MERCHANDISING GRAPPLE

(71) Applicants: Anthony L. Cameron, Soddy Daisy, TN (US); Kimberly A. Wright, Ripon, CA (US)

(72) Inventors: Anthony L. Cameron, Soddy Daisy, TN (US); Kimberly A. Wright, Ripon, CA (US)

(*) Notice: Subject to any disclaimer, the term of this patent is extended or adjusted under 35 U.S.C. 154(b) by 0 days.

(21) Appl. No.: 13/653,819

(22) Filed: Oct. 17, 2012

(65) Prior Publication Data

US 2013/0094935 A1 Apr. 18, 2013

Related U.S. Application Data

(60) Provisional application No. 61/547,780, filed on Oct. 17, 2011.

(51) Int. Cl.
*B25J 1/02* (2006.01)

(52) U.S. Cl.
USPC .............................. 294/16; 294/22; 294/118

(58) Field of Classification Search
USPC ............ 294/8.5, 11, 16, 22, 30, 31.1, 92, 118
See application file for complete search history.

(56) References Cited

U.S. PATENT DOCUMENTS

| | | | | |
|---|---|---|---|---|
| 134,604 A | * | 1/1873 | Johnson | 294/28 |
| 139,177 A | * | 5/1873 | Moloney | 81/409 |
| 1,149,476 A | * | 8/1915 | Thebert | 294/118 |
| 1,261,065 A | * | 4/1918 | Smend et al. | 294/87.1 |
| 1,365,227 A | * | 1/1921 | Clark | 294/106 |
| 3,361,468 A | * | 1/1968 | Case | 294/8 |
| 4,055,364 A | * | 10/1977 | Breite | 294/16 |
| 4,215,889 A | * | 8/1980 | Rayburn | 294/118 |
| 5,435,611 A | * | 7/1995 | Campbell et al. | 294/16 |
| 5,794,999 A | * | 8/1998 | Corsaro | 294/16 |
| 6,502,875 B1 | * | 1/2003 | Berry | 294/27.1 |

* cited by examiner

*Primary Examiner* — Dean Kramer
(74) *Attorney, Agent, or Firm* — Womble Carlyle Sandridge & Rice, LLP

(57) ABSTRACT

A merchandising grapple is disclosed for removing retail items such as beverage cans, bottles, boxes, and the like from shipping containers in groups and placing them in groups on display shelves within a retail establishment. The grapple has spaced features that receive and hold the items in groups of several items and may have a handle for gripping the grapple and a slip joint for adjusting a width of the grapple. A method includes stocking display shelves by removing items in groups from shipping containers and placing them in groups on display shelves.

7 Claims, 3 Drawing Sheets

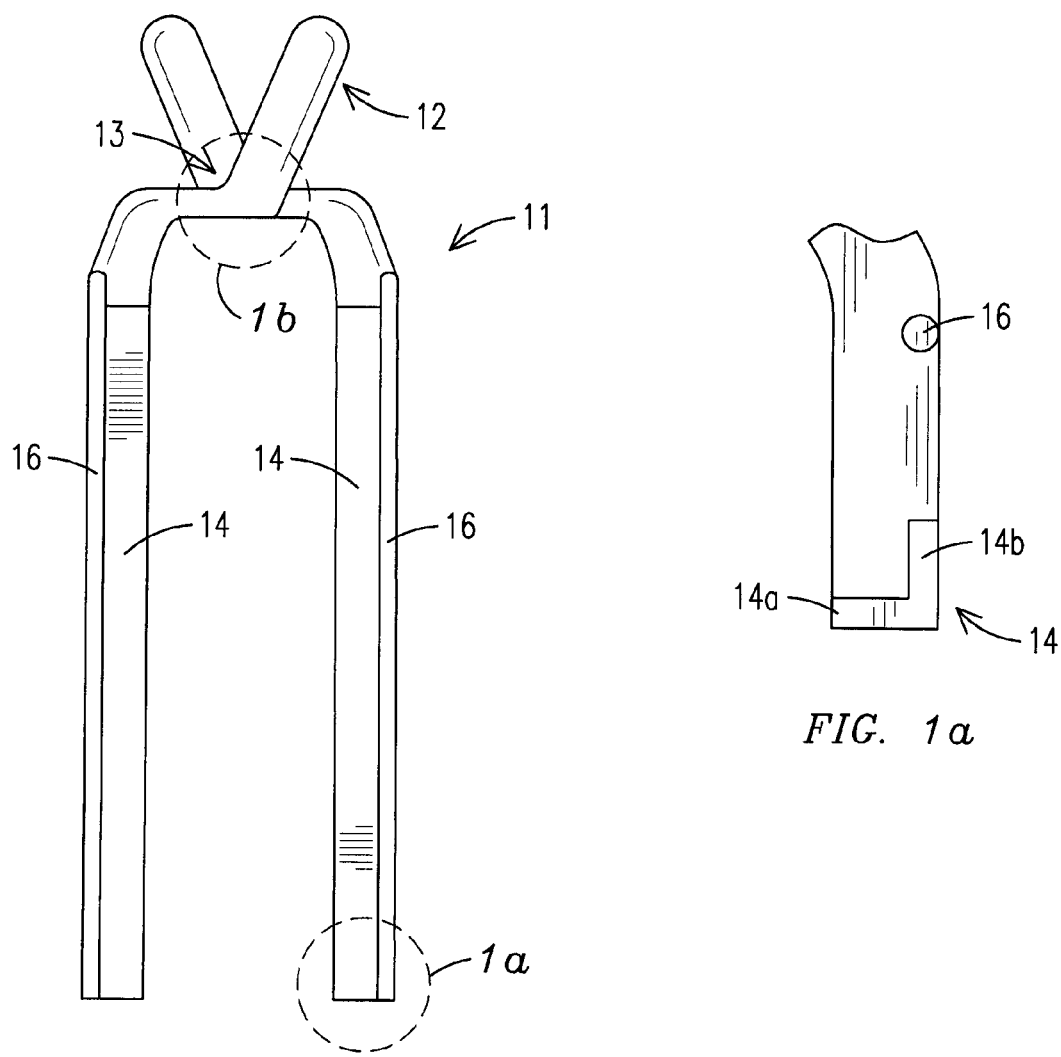
FIG. 1
FIG. 1a
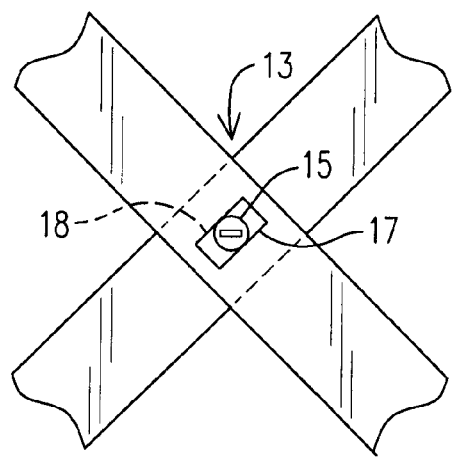
FIG. 1b

MERCHANDISING GRAPPLE

REFERENCE TO RELATED APPLICATION

Priority is hereby claimed to the filing date of U.S. provisional patent application No. 61/547,780 filed on Oct. 17, 2011.

TECHNICAL FIELD

This disclosure relates generally to the merchandising of articles in retail stores and more specifically to stocking or re-stocking store shelves with merchandise such as cans and bottles.

BACKGROUND

A costly activity for grocery stores, convenience stores, drug stores, and other retail businesses is the restocking of merchandise on display shelves, the resetting of shelves, and merchandise rotation; i.e. the placing of newer merchandise behind older merchandise. Unlike warehousing and distribution activities where product is handled in pallet and case quantities, stocking retail shelves often involves placing individual units of a product or item or article on shelves. Thus, the rate at which product can be restocked or rotated per merchandising hour is limited by how quickly a human stocker can place individual items on the shelves.

Similarly, a costly activity for Direct Store Delivery (DSD) companies also is the restocking and resetting of shelves. In these situations, there is an added productivity constraint in that DSD merchandisers are largely unsupervised and can be less diligent. Accordingly, the rate at which shelves are restocked and reset can be even lower in DSD situations. One specific DSD industry involves the delivery and stocking of soft drinks. Soft drink packaging varies from individual cans to PET bottles of numerous sizes including 16 and 20 ounce, 2-liter, and ½ liter 6-packs. Shelving configurations vary from single serve presentation in coolers, cold vaults, and vending machines to multipacs on grocery shelves and end-caps. Such variation in package and shelving configurations adds even more complexity to the merchandising of such items, and therefore limits further the productivity of people stocking and resetting shelves.

A need exists for a system and method that improve upon the inefficiencies mentioned above and others. More specifically, a need exists for tools usable by those who restock and rotate merchandise on store shelves to increase significantly the speed and efficiency of these activities. It is to the provision of such a system and methodologies that the present invention is primarily directed.

SUMMARY

Briefly described, a merchandising grapple is disclosed for removing multiple items such as beverage cans and beverage bottles in a group from shipping containers and loading them as a group into a store shelf. In one embodiment, the grapple has spaced apart forks designed to receive and hold a group of several cans and to facilitate insertion of the group of cans onto a display shelf. In another, the grapple is configured to hold several PET bottles and has rails that fit beneath the shoulders or neck of the bottles so that they are suspended from the grapple. In use, several cans or bottles (or other articles) are grasped and held by the grapple and the entire group can be slid into an empty lane of a store shelf at the same time. Also, a remaining group of older cans or bottles can be removed from a shelf simultaneously with the grapple, a group of newer cans or bottles loaded in the grapple behind the older ones, and the combined group slid back into a lane of the shelf. In this way, shelves are quickly reset with merchandise rotation; i.e. older merchandise in front. These and other features, aspects, and advantages will be better appreciated upon review of the detailed description set forth below, when taken in conjunction with the accompanying drawing figures, which are briefly described as follows.

BRIEF DESCRIPTION OF THE DRAWINGS

FIGS. 1, 1*a*, 1*b*, and 1*c* illustrate one embodiment of a merchandising grapple for use with merchandise in cans.

DETAILED DESCRIPTION

Figure 1C:
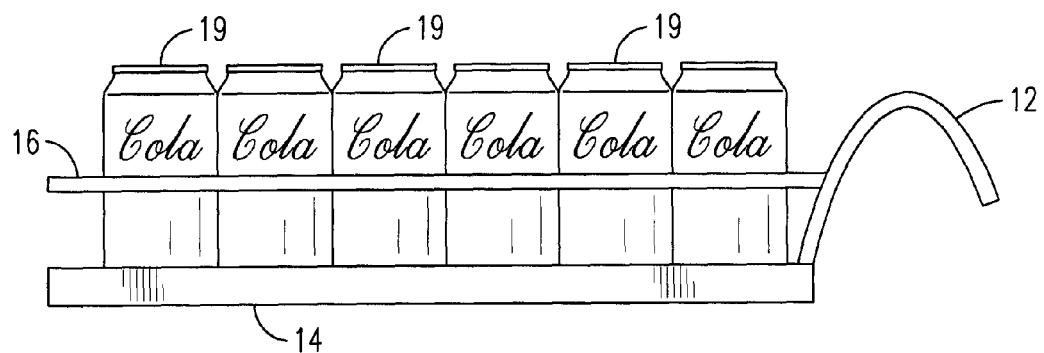

The entire content of the provisional patent application to which priority is claimed above is hereby incorporated by reference in its entirety.

Reference will now be made to the drawing figures, wherein like reference numerals, where appropriate, indicate like parts throughout the several views. FIG. 1 illustrates a merchandising grapple of a first embodiment designed for use with most grocery items, including cans, boxed goods, and small bottles. The merchandising grapple of FIG. 1 will be described for the sake of clarity within the context of stocking beverage cans, but it will be understood that the invention is not limited to beverages or cans and is usable to stock merchandise in other containers such as boxes.

The merchandising grapple 11 is formed with a handle 12 that includes an adjustable slip joint 13. A pair of forks 14 is attached to and project from the lower end of the handle and, as shown in FIG. 1*a*, each fork is configured with an angled cross section having a horizontal leg 14*a* and a vertical leg 14*b*. Retaining rails 16 are attached to the handle 12 intermediate its upper and lower ends and the retaining rails 16 extend above and substantially parallel to the forks 14.

The slip joint 13, detailed in FIG. 1*b*, comprises slots 17 and 18 in the region where the arms of the handle 12 cross and a set screw or bolt 15 extends through the slots 17 and 18. For larger products, a user can widen the space between the forks 14 to correspond to the width of the product by releasing the set screw 15 thereby allowing it so slide within the slots 17 and 18. The arms of the handle 12 can then be adjusted so that the forks 14 attain the proper spacing. Once the appropriate spacing is obtained for a given product or package, the set screw 15 is retightened to fix the forks at the proper spacing. Of course, the reverse it true when adjusting the merchandising grapple to narrow the spacing between the forks to accommodate containers of narrower widths. While slots and a set screw of bolt are shown in the illustrated embodiments, other mechanisms for adjusting the spacing of the forks may be substituted with equivalent results. For example, a toothed slot and pin arrangement similar to those found in certain pliers may be used as may other arrangements that permit the spacing between the forks to be adjusted and set.

FIG. 1c is a side elevational view showing the merchandising grapple of this embodiment loaded with articles to be shelved; in this case cola cans 19. The weight of the cans is supported on the horizontal legs 14a of the spaced forks 14 and the spacing of the forks is such that the vertical legs 14b of the forks reside against the sides of the cans at their bottoms to hold the cans in the grapple in a linear array. The rails 16 prevent the cans from tipping. This embodiment of the grapple is able to slide under product such as a group of cans within a shipping case or container and the product is then pulled in a group from the shipping container rather than one at a time as in manual stocking. In this regard, the forward ends of the horizontal legs of the forks 14 may be tapered to a thin edge to allow the horizontal legs to slip easily beneath containers of product to gather a group of containers within the grapple. When a group of containers is captured, the user may squeeze the handle like a pair of pliers to grip the containers between the vertical legs 14b of the forks and the retaining rails 16. A group of containers is then loaded into the merchandising grapple.

Once the merchandising grapple 11 is loaded with a group of containers, the entire group can be slid out of their shipping container and moved to the display shelf. At the display shelf, the merchandising grapple and its group of containers are slid into the display shelf in one fluid motion. Once positioned within the display shelf, the grapple is released by relieving inwardly directed squeezing force on the grapple handle. The released grapple is then slid out of the display shelf from underneath the containers, leaving the entire group of containers on the display shelf. It will thus be seen that a group of containers such as beverage cans can be retrieved from their shipping container and placed on a display shelf in a very efficient manner that is much more effective and faster than old time single item stocking techniques where each container is removed and placed on the shelf independently. For example, if the merchandising grapple holds 6 containers as shown in FIG. 1c, then the time and effort required to stock these items may be reduced by a factor of approximately 6.

The concepts embodied in the merchandise grapple of this disclosure are applicable to the stocking and shelving of a wide multitude of different products including, without limitation, food cans and containers of all types; boxes such as cereal and detergent boxes; bottles such as drink bottles, juice bottles, spray bottles, personal care product bottles and others; hanging packages; and virtually any type of container that is or can be shelved in queues on a store shelf. Thus, the merchandise grapple has wide multi-faceted appeal to a broad customer base. The following description of a specific example is presented within the context of shelving PET bottles such as 2-liter beverage bottles. It will be understood, however, that this is merely one example of an application of the merchandising grapple of this invention and that the invention is in no way limited to the shelving of PET bottles.

Figure 2:
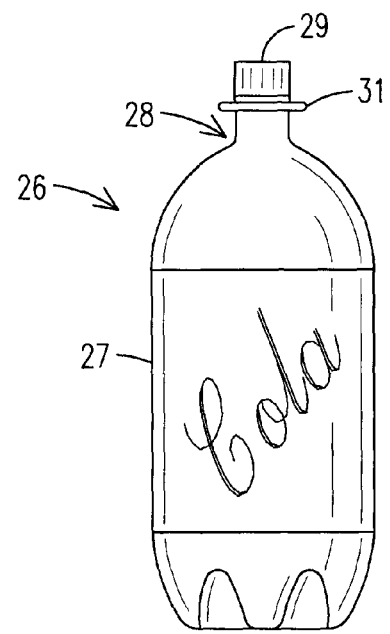
FIG. 2 illustrates a typical PET bottle of the type used to contain beverages.

FIG. 2 illustrates a typical PET bottle of the type used to contain beverages. The bottle 26 has a body 27 that contains beverage. The body 27 has a neck 28 and a cap 29, which typically is a screw-on cap. An annular shoulder 31 projects outwardly just beneath the cap and is provided to allow consumers to grasp and pick up the bottle easily when desired. PET bottles vary, but the configuration shown in FIG. 2 is common and illustrates features utilized in the present invention.

Figure 3:
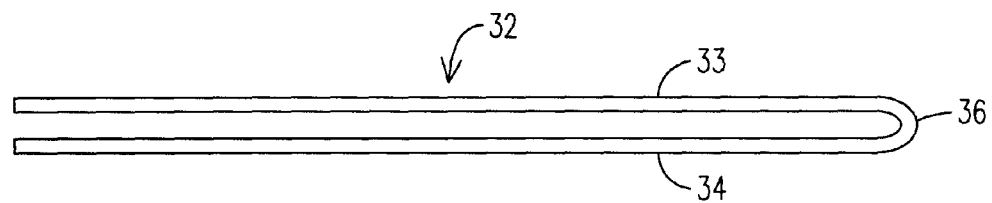
FIG. 3 illustrates another embodiment of a merchandising grapple for use with PET bottles such as that of FIG. 2.
Figure 4:
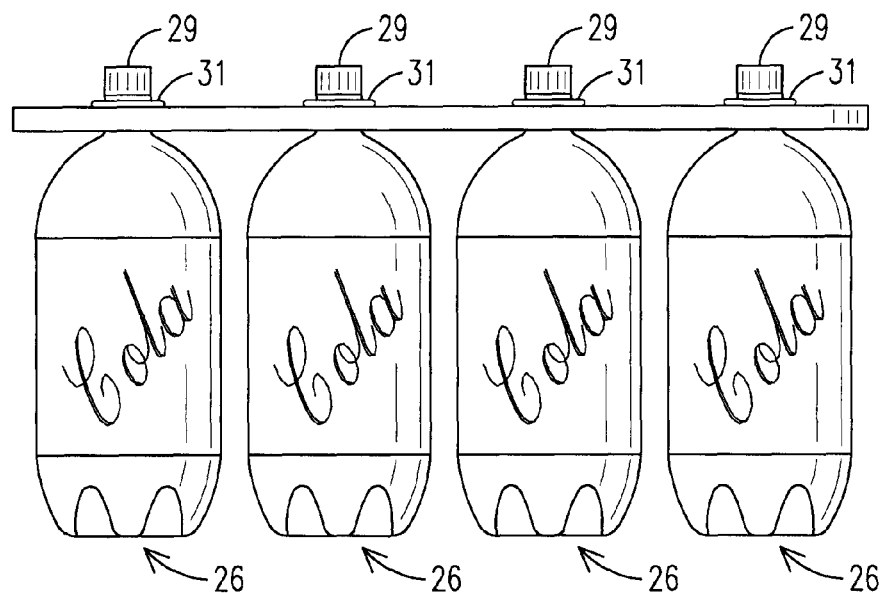
FIG. 4 shows the merchandising grapple of FIG. 3 loaded with several PET beverage bottles ready to be loaded onto a shelf.

FIG. 3 illustrates an alternate embodiment of a merchandising grapple 32 designed for use with PET bottles such as bottle 26 shown in FIG. 2. The grapple 32 is formed with spaced apart arms 33 and 34 connected at one end by a bight 36 or other connecting structure. The spacing between the arms 33 and 34 is sufficiently wide to receive the necks 28 of PET bottles but sufficiently narrow so that the shoulders 31 of such bottles cannot slip between the arms. As illustrated in FIG. 4, a user may slip the grapple 32 over the necks of a plurality of PET bottles just beneath the shoulders 31 of the bottles. The user can then lift the bottles in a group from a shipping case or carton using the grapple, move the group to a display shelf, and place them in a group on the display shelf. The grapple is then slid from beneath the shoulders of the bottles and the process is repeated until all desired bottles are placed on the shelf.

In cases where one or two older bottles (or other items) remain on the shelf and merchandise rotation is desired, a user may first slip the grapple over the necks and beneath the shoulders of these older bottles, remove the older bottles from the shelf in a group, and fill the remaining space in the grapple with new bottles from their shipping container. The resulting group can then be placed back in the display shelf as described above. In this way, the shelf is restocked and rotated with older merchandise in front of newer merchandise. This procedure is common to all embodiments of the merchandising grapple of this invention and greatly enhances the efficiency of rotating stock on a display shelf.

Figure 5:
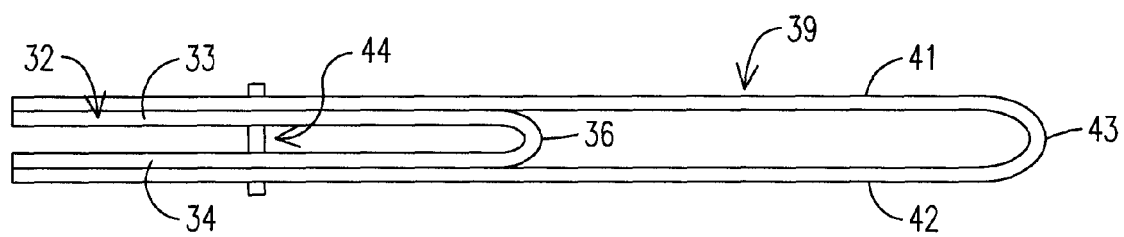
FIG. 5 illustrates yet another embodiment of a merchandising grapple according the disclosure.

In some instances there is a need to place 2-liter bottles (or other merchandise) on a higher shelf and behind earlier dated product for rotational purposes. These higher locations on display shelves may be difficult to reach without step stools or ladders. For such situations, an extension handle, illustrated in FIG. 5, can be added to the grapple of FIG. 4 to accommodate the extra required reach. More specifically, extension handle 39 is shown in FIG. 5 attached to grapple 32. In this embodiment, the extension handle also has arms 41 and 42 connected by a bight 43; however, other configurations certainly are possible. A pin 44 can be secured to the grapple 32 to provide a stop for bottles before they reach the bight 36 and to determine the number of bottles held by the grapple. The handle 39 may be configured to curve downwardly from the grapple 32 to allow a user to grasp the handle and raise the grapple to a higher location than he or she could otherwise reach. In use, the extension handle 39 of this embodiment allows a user to lift a group of bottles up to a top or high shelf and place them properly on the shelf without the need for a ladder or other step tool.

Figure 6:
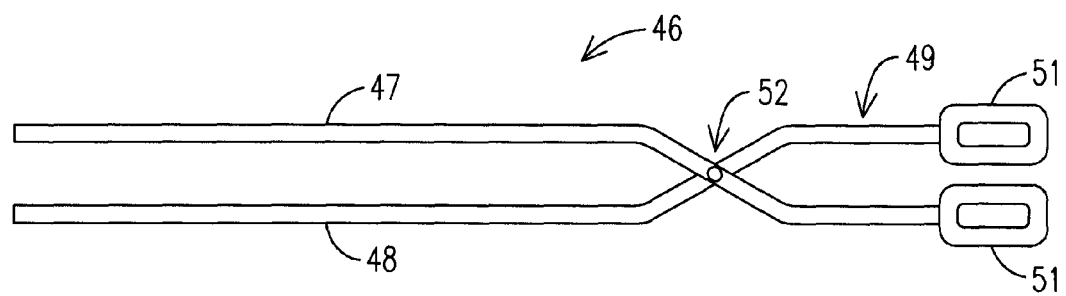
FIG. 6 illustrates still another embodiment of a merchandising grapple according to the disclosure.

Many products to be shelved are not bottles and/or do not include rims or necks such as those usually found in beverage bottles. The embodiment of the merchandising grapple shown in FIG. 6 accommodates these types of products. This embodiment comprises a scissor-like configuration with a pair of spaced arms 47 and 48 extending from a slip joint 52. A handle 49 extends rearwardly from the slip joint 52 and terminates in scissor grips 51. The slip joint 52 may be selectively adjustable similar to that of FIG. 1b if desired to adjust the spacing between the arms 47 and 48 to accommodate a particular product container.

In use, the slip joint is adjusted until the space between the arms 47 and 48 corresponds to the shape and size of a package to be shelved, be it a bottle, can, box, or other type of package. The arms can then be closed around such packages like jaws of a pair of pliers and used as described above to move the packages in a group from their shipping case onto a display shelf. In this embodiment, the scissor handles can be configured to curve upwardly or downwardly as needed. Further, the arms may be configured in any shape necessary to engage and carry product containers to be shelved. For example, they may be configured with angled cross sections as shown in FIG. 1a, with a scalloped or toothed configuration to embrace a particular shape of container, or simply with rubber or other friction reducing coatings to prevent product containers from slipping out from between the spaced arms 47 and 48 when gripped.

The invention has been described herein within the context of preferred embodiments and methodologies considered by the inventors to represent the best mode of carrying out the invention. It will be understood by skilled artisans, however, that a wide range of additions, deletions, and modifications, both subtle and gross, might well be made to the illustrated embodiments without departing from the spirit and scope of the invention as set forth in the claims.

What is claimed is:

1. A merchandising grapple for loading articles in groups on a display shelf, the merchandising grapple comprising:
    a pair of spaced apart arms configured to engage and hold a group of articles in a predetermined configuration between the spaced apart arms;
    a handle connected to the pair of spaced apart arms configured to be grasped by a user to manipulate a group of articles held between the spaced apart arms;
    the spaced apart arms having angled cross sections;
    each arm having a horizontal portion to support articles to be loaded and a vertical portion to retain the articles on the horizontal portion; and
    a pair of spaced apart retaining rails extending along and above each of the arms to prevent tipping of articles.

2. A merchandising grapple as claimed in claim 1 further comprising a mechanism in the handle configured to permit adjustment of the spacing between the spaced apart arms to accommodate articles to be loaded.

3. A merchandising grapple as claimed in claim 2 wherein the handle includes crossing portions and the mechanism to permit adjustment is in the crossing portions of the handle.

4. A merchandising grapple as claimed in claim 3 wherein the mechanism comprises a pair of crossing slots.

5. A merchandising grapple as claimed in claim 4 further comprising a set screw extending through the crossing slots, the set screw configured to be loosened to permit adjustment of the spacing between the arms and retightened to fix the spacing.

6. A merchandising grapple as claimed in claim 3 wherein the handle is formed with scissor grips.

7. A merchandising grapple as claimed in claim 1 wherein the pair of spaced apart retaining rails is attached to the handle.

* * * * *